(12) United States Patent
Fukai

(10) Patent No.: US 7,232,102 B2
(45) Date of Patent: Jun. 19, 2007

(54) MEMBER TILTING MECHANISM AND MIRROR SYSTEM

(75) Inventor: Akira Fukai, Shizuoka (JP)

(73) Assignee: Murakami Corporation, Shizuoka (JP)

( * ) Notice: Subject to any disclaimer, the term of this patent is extended or adjusted under 35 U.S.C. 154(b) by 85 days.

(21) Appl. No.: 11/175,257

(22) Filed: Jul. 7, 2005

(65) Prior Publication Data

US 2006/0006305 A1 Jan. 12, 2006

(30) Foreign Application Priority Data

Jul. 9, 2004 (JP) ............................. 2004-203261

(51) Int. Cl.
*A47G 1/24* (2006.01)
(52) U.S. Cl. ...................... 248/476; 359/871
(58) Field of Classification Search ................ 248/466, 248/476, 479, 485; 359/876, 871, 872, 874, 359/875
See application file for complete search history.

(56) References Cited

U.S. PATENT DOCUMENTS 4,347,014 A 8/1982 Smith
5,042,932 A * 8/1991 Pent ........................... 359/874
6,082,139 A 7/2000 Davidziak
6,364,496 B1 * 4/2002 Boddy et al. ............... 359/877
2001/0010601 A1 * 8/2001 Schnell et al. .............. 359/877

FOREIGN PATENT DOCUMENTS

| CN | 1057031 A | 12/1991 |
|---|---|---|
| DE | 1 098 382 | 1/1961 |
| JP | 2003-194040 | 7/2003 |
| WO | WO 94/26556 | 11/1994 |

* cited by examiner

*Primary Examiner*—Ramon O Ramirez
(74) *Attorney, Agent, or Firm*—Oblon, Spivak, McClelland, Maier & Neustadt, P.C.

(57) ABSTRACT

A member tilting mechanism includes a housing rear having a concave spherical portion, a cap support having a convex spherical portion, a plate pivot having a pivot portion, which is a tubular portion with an arc-like cross section, a spring plate which presses against the cap support towards the housing rear in such a manner that the plate pivot is allowed to tilt in such a state that the pivot portion is held by the concave spherical portion and the convex spherical portion, a tapping screw for fixing the spring plate to the housing rear, and a stopper that is fixed to the housing rear for restricting the deformation of the spring plate in an anti-pressing direction. According to this structure, the stopper restricts the deflection of the spring plate in the anti-pressing direction so as to prevent the excessive tilt of the plate pivot.

18 Claims, 8 Drawing Sheets

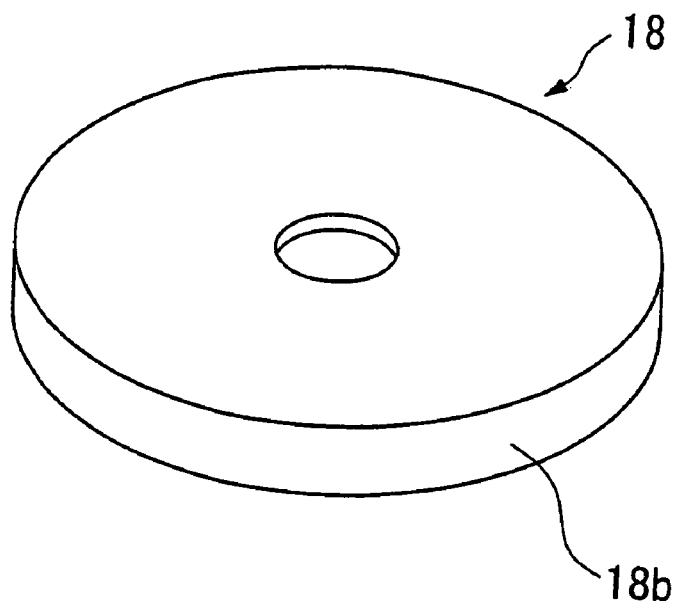
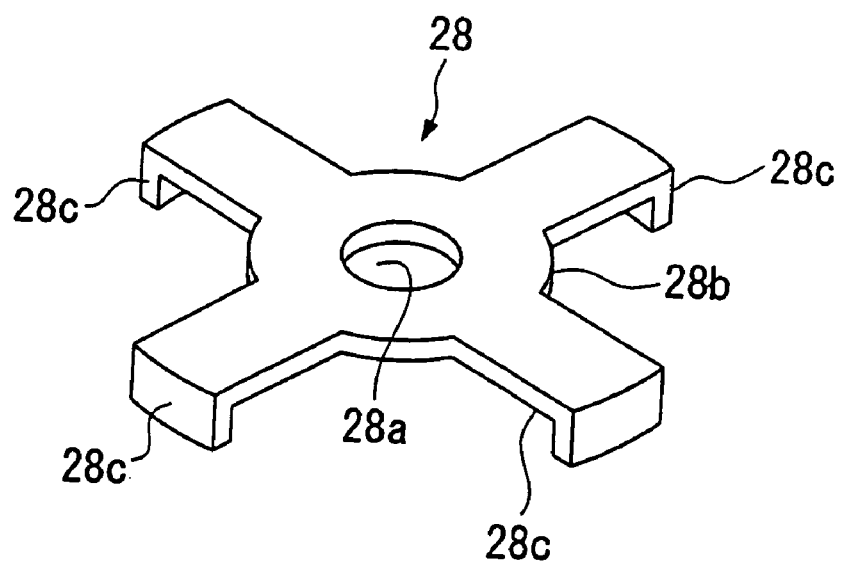

MEMBER TILTING MECHANISM AND MIRROR SYSTEM

This application is based on Japanese Patent Application No. 2004-203261, which is incorporated herein by reference.

BACKGROUND OF THE INVENTION

1. Field of the Invention

The present invention relates to a member tilting mechanism for use in, for example, a vehicle door or side mirror system and a mirror system incorporating the member tilting mechanism.

2. Description of the Related Art

In general, a tilting mechanism is adopted to be installed in, for example, a vehicle door or side mirror system for tilting a mirror surface vertically and horizontally so as to adjust the mirror surface angularly. This tilting mechanism is normally provided within a mirror housing and is configured as described in, for example, JP-A-2003-194040 (FIGS. 6 and 7). Namely, this tilting mechanism includes, as shown in instant FIG. 10, a housing front 2 that is fixed to a body member (not shown) and is adapted to accommodate therein a motor 1, a housing rear 3 that is covered by the housing front 2, a plate pivot 4 that is mounted on the housing rear 3 and on which a mirror (not shown) is mounted, and a substantially semispherical cap support 5 which holds the plate pivot 4 in such a manner as to be tilted together with the housing rear 3 therebetween.

On the housing rear 3, a concave spherical portion 3a is formed and a cylindrical support tube portion 3b is provided at a center of the concave spherical portion 3a so formed in such manner as to protrude along a central axis thereof. In addition, a convex spherical portion 5a is formed on the cap support 5 along an outer circumference thereof, and a through hole 5b is also formed in the cap support 5 so that the support tube portion 3b can pass therethrough. Furthermore, a pivot portion 4a, which is a tubular portion with an arc-like cross section, is formed on the plate pivot 4 in such a manner as to slide and tilt while being held between the concave spherical portion 3a and the convex spherical portion 5a.

The support tube portion 3b is put in such a state that the support tube portion 3b is caused to lie or is passed in the through hole 5b in the cap support 5, and a tapping screw 7 is screwed into a mount hole in the support tube portion 3b from an upper end of the support tube portion 3b with a spring plate 6, which is a leaf spring member, placed on the upper end of the support tube portion 3b, whereby the spring plate 6 is fixed in place thereat. The spring plate 6 is formed into a cruciform shape, and a spring center portion 6a is fixed to the support tube portion by means of the tapping screw 7, and distal end portions of deflection portions 6b which extend from the spring center portion 6a radially in four directions are made to press against an outer edge portion of the cap support 5 so that the cap support 5 is pressed towards the housing rear 3. According to this structure, the convex spherical portion 5a is brought into press contact with the pivot portion 4a, which is, in turn, brought into press contact with the concave spherical portion 3a, whereby the convex spherical portion 5a and the pivot portion 4a are allowed to slide relative to the pivot portion 4a and the concave spherical portion 3a, respectively, through such spherical contacts. Consequently, the plate pivot 4 is supported in such a manner as to be tilted in all directions relative to the housing rear 3.

In addition, an adjusting screw 2a is provided in the housing front 2 in such a manner as to protrude therefrom, and an adjusting nut 9 is screwed on the adjusting screw 2a. A worm wheel 10, which is connected to a rotational shaft of the motor 1 and is allowed to move relatively in an axial direction of the rotational shaft, is brought into integral engagement with an outer circumference of the adjusting nut 9 relative to a rotational direction. Furthermore, a spherical joint portion 9a is formed at a distal end portion of the adjusting nut 9, which is then made to fit in a concave joint portion 4b formed in the plate pivot 4 in a press fit state.

Consequently, by driving the motor 1, the adjusting nut 9 moves in the axial direction via the worm wheel 10, so that the plate pivot 4 in which the distal end portion of the adjusting nut 9 is fitted is pushed or pulled, whereby the pivot plate 4 can be electrically tilted together with the mirror. Note that the motor 1, adjusting screw 2a, adjusting nut 9, worm wheel 10 and concave joint portion 4b are each provided in two for vertical and horizontal adjustments.

The related art still has, however, the following problems to be solved.

In the tilting mechanism described in JP-A-2003-194040, when mirrors are replaced at a repair shop or the like, if the mirror is pulled in a direction A indicated in FIG. 10, the plate pivot 4, which is fixed to the mirror, is also pulled in the direction A. While the plate pivot 4 can normally be deflected to a position where a restriction is applied, in the event that the mirror continues to be pulled further in the direction A from that condition, the spring plate 6 is deflected in an opposite direction to the pressing direction (an anti-pressing direction B), whereby the mirror and the plate pivot 4 are deflected excessively, often leading to a problem that the adjusting nut 9 is dislocated from the adjusting screw 2a.

In addition, while the adjusting nut 9 continues to push the plate pivot 4 until a restriction is applied while being operated electrically, the plate pivot 4 is lifted excessively by such an extent that the spring plate 6 deflects, whereby the plate pivot 4 and the housing rear 3 are made to be separated from each other, often leading to a problem that loosening (beating) occurs in the mirror.

To cope with this, while there is considered a method for making it difficult for the spring plate 6 to be deflected by increasing the spring constant thereof, in this case, the sliding resistance of the pivot portion 4a is also increased, often resulting in a problem that the increase in the sliding resistance inconveniently constitutes a cause for a malfunction.

SUMMARY OF THE INVENTION

The invention was made in view of the problems that have been described above, and an object thereof is to provide a member tilting mechanism which can suppress the deflection of the spring plate without increasing the sliding resistance of the pivot portion and a mirror system incorporating the member tilting mechanism.

The invention adopts the following structures in order to solve the problems. Namely, according to a first aspect of the invention, there is provided a member tilting mechanism comprising a first member including a concave spherical portion, a second member including a convex spherical portion, a third member including a pivot portion that is held by the concave spherical portion and the convex spherical portion, an elastic member for pressing one of the first member and the second member towards the other thereof so that the third member can tilt relatively while being so held, and a restricting member for restricting a deformation of the elastic member in an anti-pressing direction.

Since this member tilting mechanism includes the restricting member which restricts the deformation of the elastic member in the anti-pressing direction, even in the event that a large relative force is applied in such a manner that the third member tilts largely relative to the first member, it is possible to restrain the elastic member such as the spring plate from being deformed in the anti-pressing direction.

In addition, according to a second aspect of the invention, there is provided a member tilting mechanism as set forth in the first aspect of the invention, wherein the elastic member comprises a central non-deflection portion that is fixed in the vicinity of a center of the tilt and at least one deflection portion which extends from the non-deflection portion to press against one of the first member and the second member at a distal end portion thereof, and the restricting member is brought into abutment with the distal end portion of the deflection portion so as to restrict a movement of the distal end portion in the anti-pressing direction.

Namely, according to this member tilting mechanism, the restricting member restricts the movement of the distal end portion which deflects most largely in the deflection portions, whereby the deflecting deformation of the elastic member can be restrained more effectively.

Furthermore, according to a third aspect of the invention, there is provided a member tilting mechanism as set forth in the second aspect of the invention, wherein the restricting member is formed into the shape of a ring or disc which is adapted to restrict the distal end portion of the deflection portion by an outer circumferential edge portion thereof with a central portion thereof disposed on the non-deflection portion.

Namely, according to this member tilting mechanism, by adopting the restricting member which is formed into the shape of a ring (the shape of a washer) or the shape of a disc, the deflection occurring at all the deflection portions can easily be suppressed by the outer circumferential edge portion of the single restricting member. In addition, since the deflection of the respective deflection portions are suppressed along the full circumference of the outer circumferential edge portion, even in case the elastic member is caused to deviate slightly in a circumferential direction, a good deflection preventive effect still can be obtained.

In addition, according to a fourth aspect of the invention, there is provided a member tilting mechanism as set forth in any of the first to third aspects of the invention, wherein the restricting member is preferably made up of a restricting portion for performing the restriction and a fixing portion for fixing the elastic member at a predetermined position together with the restricting portion, which restricting portion and fixing portion are integrated with each other.

Namely, according to this member tilting mechanism, by using the restricting member in which the fixing member which fixes the elastic member and the restricting member are made to be integrated with each other, the elastic member is fixed at the same time that the restricting member is fixed, whereby both the members can be fixed with a high positional accuracy and the number of assembling steps can be reduced. Furthermore, the number of components involved can be reduced, so that the production costs can be reduced.

According to a fifth aspect of the invention, there is provided a mirror system comprising a mirror member having a mirror surface, a mirror support member for supporting the mirror member, a member tilting mechanism according to the invention as discussed above which is adapted to support the mirror support member in such a manner as to be tilted, and a body member for supporting the member tilting mechanism, wherein the mirror member is fixed to one of the first member and the third member, and the body member is fixed to the other of the first member and the third member.

According to this mirror system, since the mirror support portion and the mirror member can be tilted relative to the body member by the member tilting mechanism of the invention while restricting the deflection of the elastic member, even in the event that the mirror support member and the mirror member are pulled in the direction in which those members are tilted largely when mirrors are replaced or the electric force such as imparted by the motor or the like is applied largely in the tilting direction, it is possible to prevent the members which are in the fitted state from being dislocated from each other due to the deflection of the elastic member, or to prevent one of the first member and the third member which is to fixed to the mirror support member from being separated from the other of the first member and the third member which is fixed to the body member.

Note that the mirror member and the mirror support member may be formed into an integral member.

According to the invention, the following advantages are provided.

Namely, according to the member tilting mechanism according to the invention, since the restricting member which restricts the deformation of the elastic member in the anti-pressing direction is provided, the spring constant of the elastic member such as the spring plate does not have to be increased largely, and even in case an excessive force is applied in a tilting direction, the elastic member can be restrained from being deflected, thereby making it possible to suppress the inclination of the mirror support member and the mirror member which is equal to or greater than a restriction angle. In addition, according to the mirror system which adopts the member tilting mechanism, the inclining motion based on the good sliding operation of the pivot portion can be maintained, and when mirrors are replaced or even in case a large electric force by the motor or the like is applied in the inclining direction, it is possible to prevent the mirror from being deflected equally to or larger than the restriction angle, whereby the other members which are in the fitted state can be prevented from being dislocated from each other, thereby making it possible to ensure good workability when mirrors are replaced. In addition, the dislocation of the member fixed to the mirror support portion from the member fixed to the body member or vice versa is prevented, whereby the loosening (beating) of the mirror can be reduced.

BRIEF DESCRIPTION OF THE DRAWINGS

FIG. 6 is a perspective view of a stopper in the mirror system of the second embodiment;

FIG. 7 is a perspective view showing a modified example of a stopper in the mirror system of the second embodiment;

DETAILED DESCRIPTION OF THE PREFERRED EMBODIMENTS

Hereinafter, embodiments of the invention will be described with reference to the accompanying drawings.

First Embodiment

Hereinafter, a first embodiment of a member tilting mechanism and a mirror system according to the invention will be described by reference to FIGS. 1 to 4.

Figure 1:
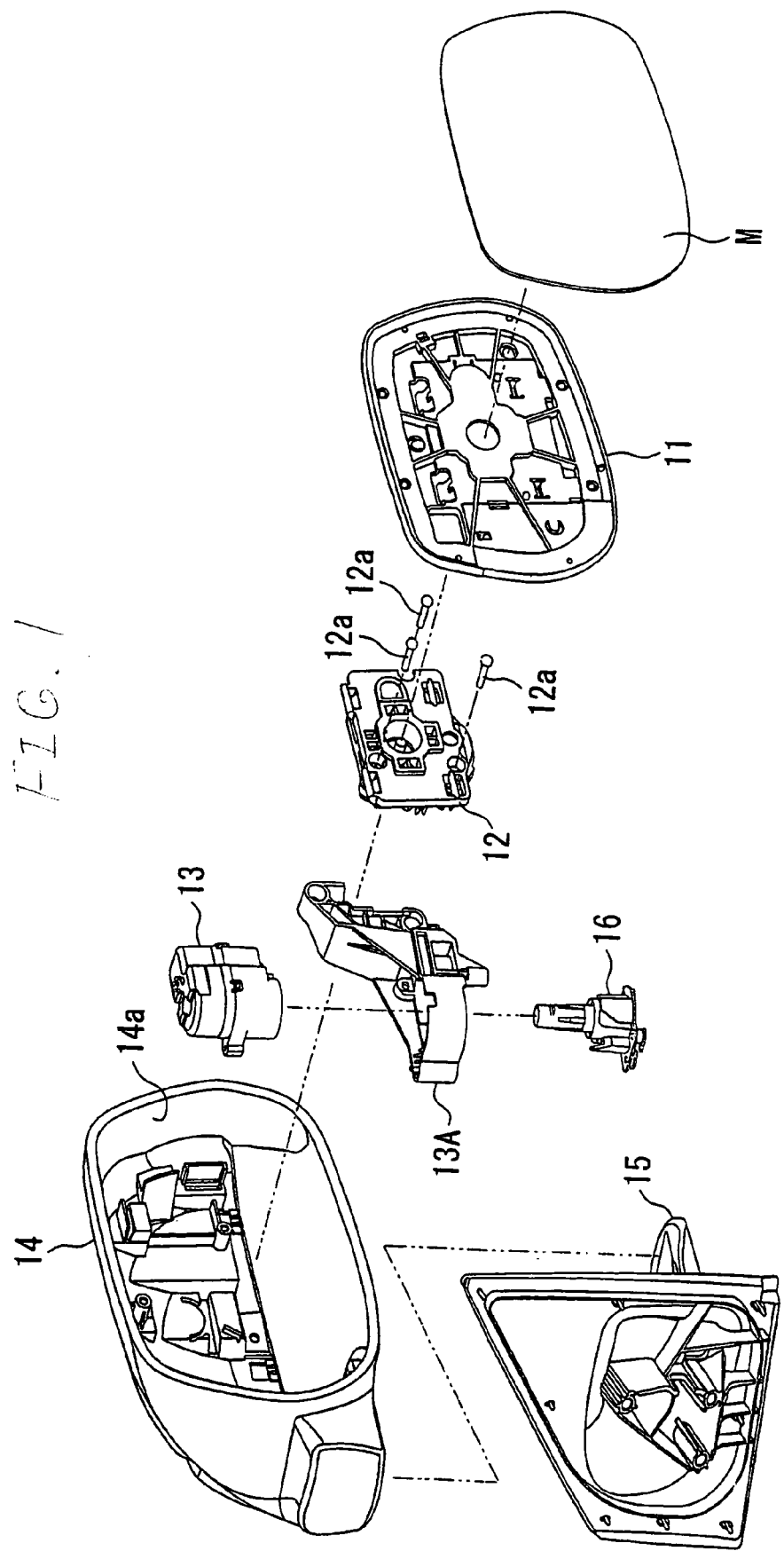
FIG. 1 is an exploded perspective view of a mirror system according to a first embodiment of the invention.

A mirror system of the embodiment is, for example, as shown in FIG. 1, a vehicle electric foldable door or side mirror system having a function in which a mirror (mirror member) M can be tilted vertically and horizontally, that is up, down, left and right and includes the mirror M in which a mirror surface is formed on a front side thereof, a mirror holder (mirror support member) 11 which supports the mirror M, a mirror surface angle adjusting unit (member tilting mechanism) 12 on which the mirror holder is mounted, an electric folding unit 13 for folding a door or side mirror which incorporates therein a drive motor (not shown), a support member 13A which accommodates therein the electric folding unit 13 and a body member 14 which accommodates inside thereof the mirror surface angle adjusting unit 12, the support member 13A and the electric folding unit 13 and in which the mirror M and the mirror holder 11 are mounted in an opening 14a thereof in such a manner as to create a closed state therein.

This mirror system is rotatably mounted on a base member 15 which is fixed to a vehicle body of an automobile. Namely, a shaft 16 mounted on the base member 15 is inserted into a proximal end portion of the body member 14 and is also passed through the support member 13A so as to be fixed to a rotational shaft (not shown) of the electric folding unit 13, whereby when the electric folding unit 13 is activated, the whole of the mirror system rotates about the shaft 16 together with the support member 13A, so that the mirror system can be folded down to the side of the base member 15 (the side of the vehicle body) or can be restored to its functioning position.

Figure 2:
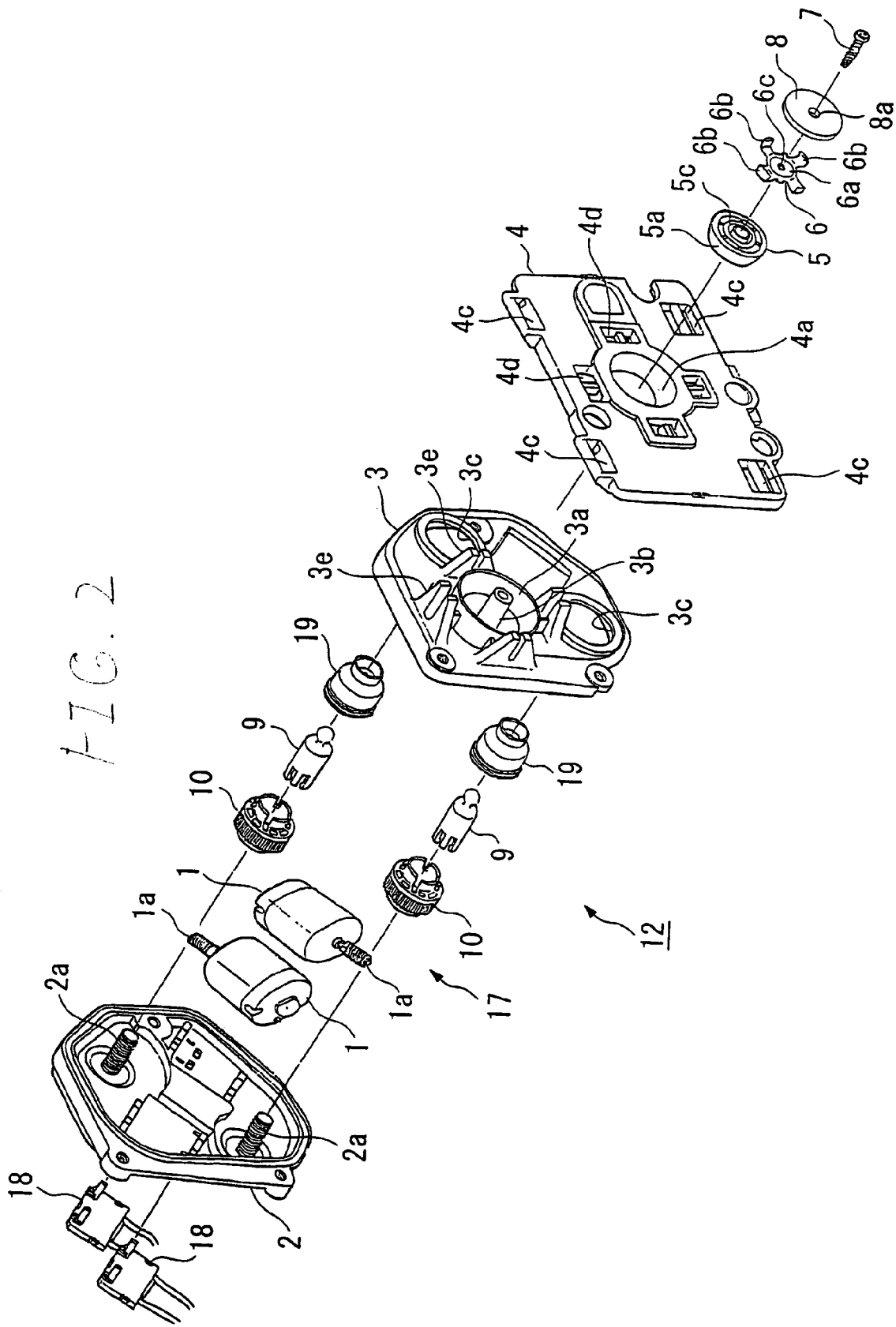
FIG. 2 is an exploded perspective view showing a mirror surface angle adjusting unit in the mirror system of the first embodiment.
Figure 3:
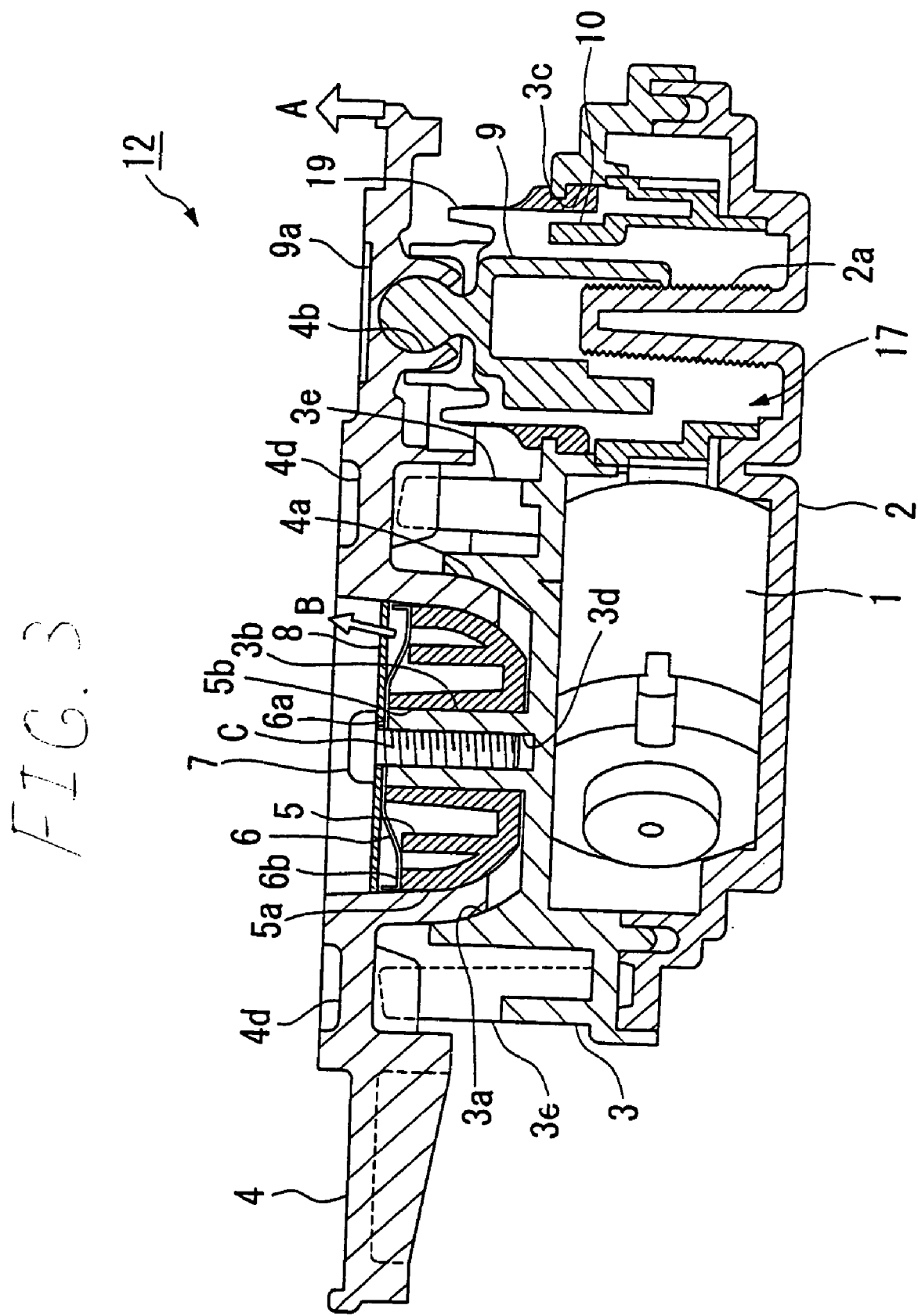
FIG. 3 is a sectional view showing the mirror surface angle adjusting unit in the mirror system of the first embodiment.

As shown in FIGS. 2 and 3, the mirror surface angle adjusting unit 12 includes a housing front 2 that is fixed to the body member 14, a housing rear (a first member) 3 that covers the housing front 2 and which has a concave spherical portion 3a, a cap support (a second member) 5 which has a convex spherical portion 5a, a plate pivot (a third member) 4 having a pivot portion 4a which is a cylindrical portion with an arc-like cross section which is held between the concave spherical portion 3a and the convex spherical portion 5a, a spring plate (an elastic member) 6 for pressing the cap support 5 towards the housing rear 3 in such a manner that the plate pivot 4 can be tilted in all directions with the pivot portion 4a so held, a tapping screw 7 which functions as a fastening screw for fixing the spring plate 6 to the housing rear 3 and a metallic stopper (a restricting member) 8 which is fixed to the housing rear 3 to thereby restrict the deformation of the spring plate 6 in an anti-pressing direction.

A pair of driving mechanisms 17 for tilting the mirror M and the mirror holder 11 together with the plate pivot 4 horizontally and vertically are provided within the housing front 2.

The pair of driving mechanisms 17 include a pair of drive motor 1 having worms 1a provided on rotational shafts thereof, a pair of adjusting screws 2a provided within the housing front 2 in such a manner as to protrude therein, a pair of adjusting nuts 9 screwed on the respective adjusting screws 2a and a pair of worm wheels 10 which are brought into integral engagement with outer circumferences of the respective adjusting nuts 9 in a rotating direction on one side and are connected to the worms 1a of the motors 1 in a meshing fashion on the other side thereof so that the worm wheels 10 can move relatively in the axial direction.

Furthermore, a spherical joint portion 9a is formed at a distal end portion of the adjusting nut 9. In addition, a connector 18, which is a motor connection terminal, is connected to each motor 1 from the outside of the housing front 2.

A cylindrical support tube 3b is provided at the center of the concave spherical portion 3a in such a manner as to protrude along an center axis of the concavely spherical surface 3a, and connecting openings 3c are formed in the housing rear 3 at positions which correspond to the pair of adjusting screws 2a, respectively. Note that the positional relationship between the support tube portion 3b and the pair of adjusting screws 2a is such that in such a state that the mirror system is mounted on the vehicle body, one of the adjusting screws 2a is disposed in parallel with the support tube 3b which is disposed in such a manner that an axial direction thereof is oriented horizontally in such a manner as to be spaced apart therefrom in a horizontal direction, whereas the other adjusting screw 2a is disposed in parallel with the support tube 3b so disposed in such a manner as to be spaced apart therefrom in a horizontal direction.

A seal cover 19 is provided in each connecting opening 3c between the plate pivot 4 and the housing rear 3 in such a manner as to cover the circumference of the adjusting nut 9.

The cap support 5 is formed into a substantially semi-spherical shape having a flat portion 5c on a front side thereof, and the convex spherical portion 5a is formed along an outer circumference thereof. In addition, a through hole 5b is formed in the cap support 5 along a center axis thereof so that the support portion 3b can pass therethrough in a fitted state. Furthermore, a plurality of ribs are formed in the interior of the cap support 5 so that the cap support 5 is made to be a rigid body.

The plate pivot 4 is formed into a substantially rectangular plate shape, and spherically concave joint portions 4b are provided on a side of the plate pivot 4 so formed which faces the housing rear 3 in such a manner that the spherical joint portions 9a of the respective adjusting nuts 9 fit therein, respectively, in a press fit state. In addition, engagement recess portions 4c are provided at upper left and right and lower left and right four locations on the plate pivot 4 in such a manner that engagement pawls (not shown) of the mirror holder 11 are brought into engagement therewith.

Furthermore, a pivot portion 4a is formed in the plate pivot 4 in such manner that the pivot portion 4a can slide and be tilted while being held by the concave spherical portion 3a of the housing rear 3 and the convex spherical portion 5a of the cap support 5. This pivot portion 4a is a tubular portion with an arc-like cross section, and an outer circumferential surface thereof is formed into a convexly spherical surface in such a manner as to be brought into spherical contact with the concave spherical portion 3a, whereas an inner circumferential surface is formed into a concavely spherical surface in such a manner as to be brought into spherical contact with the convex spherical portion 5a of the cap support 5.

Four rear-side engagement portions 3e and four pivot-side engagement portions 4d are provided on the housing rear 3 and the plate pivot 4, respectively, in such a manner that the engagement portions on both the members are brought into engagement with each other so that the housing rear 3 and the plate pivot 4 can be fixed to each other.

The tapping screw 7 is screwed into the support tube portion 3b from an upper portion thereof with the spring plate 6, which is a leaf spring member, and the stopper 8 disposed on the spring plate 6 held between the tapping screw 7 and the support tube portion 3b in such a state that the support tube portion 3b is caused to lie or is passed in the through hole 5b in the cap support 5.

The spring plate 6 is formed into a cruciform shape and has a spring center portion (non-deflection portion) 6a that is fixed to a tilt center of the plate pivot 4 or in the vicinity thereof and deflection portions 6b which extend radially from the spring center portion 6a in four directions as far as the vicinity of an outer edge portion of the convex spherical portion 5a so as to press against the cap support 5 at distal end portions thereof.

A hole portion 6c is formed in the spring center portion 6a in such a manner that the tapping screw 7 is passed therethrough. In addition, the deflection portions 6b are formed in such a manner as to be bent towards the cap support 5 and are adapted to bias the cap support 5 towards the housing rear 3 so as to press the cap support 5 against the housing rear 3 in such a state that the spring plate 6 is mounted accordingly. In addition, the distal end portions of the deflection portions 6b are bent in an anti-pressing direction at intermediate positions along the length thereof in such a manner that distal ends thereof are allowed to abut with or approach the stopper 8.

According to the structure that has just been described, the convex spherical portion 5a of the cap support 5 is brought into press contact with the pivot portion 4a by means of the spring plate 6, and the pivot portion 4a is, in turn, brought into press contact with the concave spherical portion 3a of the housing rear 3. Consequently, the convex spherical portion 5a, the pivot portion 4a and the concave spherical portion 3a are brought into surface contact with each other, so that the pivot portion 4a is allowed to slide, whereby the plate pivot 4 is supported by the housing rear 3 in such a manner as to tilt in all directions relative to the housing rear 3.

Figure 4:
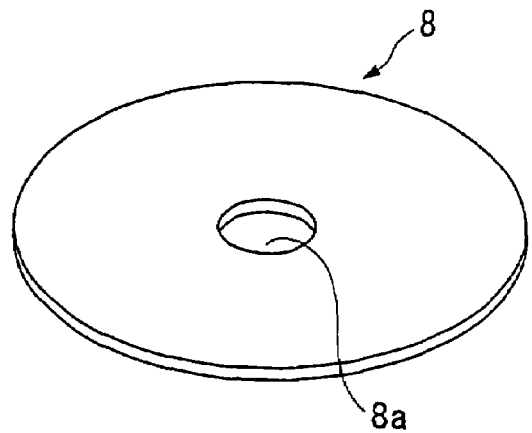
FIG. 4 is a perspective view showing a stopper in the mirror system of the first embodiment.

The stopper 8 has, as shown in FIG. 4, the shape of an annular flat washer whose center portion is disposed on the spring center portion 6a and an outer circumferential edge portion thereof is brought into abutment with the distal end portions of the deflection portions 6b so as to restrict the movement of the distal end portions in the anti-pressing direction. In addition, a through hole 8a is formed in the center of the stopper 8 in such a manner that the tapping screw 7 is passed therethrough.

Note that a tilting angle at which the stopper 8 starts to restrict the deformation of the spring plate 6 can be finely adjusted by adjusting a space (a clearance) between the distal end portions of the deflection portions 6a and the stopper 8.

This mirror surface angle adjusting unit 12 is fixed to the body member 14 by means of a unit fixing screw 12a, which is a tapping screw.

Next, the function of the mirror surface angle adjusting unit 12 in the mirror system of the invention will be described below by reference to FIG. 3.

Firstly, for example, a case will be described in which the plate pivot 4 on which the mirror M and the mirror holder 11 are mounted is pulled, when replacing mirrors.

When the plate pivot 4 is pulled in a direction A indicated in FIG. 3, the plate pivot 4 moves rotationally about a rotational center C (the spherical center of the pivot portion 4a, the convex spherical portion 5a and the concave spherical portion 3a, the tilting center), whereby the plate pivot 4 tilts. While the plate pivot 4 continues to perform the rotational movement until a normal restricting position is reached where the pivot portion 4a is still allowed to slide, when the plate pivot 4 is pulled further in the direction A, the spring plate 6 is pressed against by the cap support 5 and then attempts to deflect in an anti-pressing direction B indicated in FIG. 3.

As this occurs, since the distal end portions of the deflection portions 6b which attempt to deflect are brought into abutment with the outer circumferential edge portion of the stopper 8, the movement of the deflection portions 6b in the anti-pressing direction B is restricted, whereby the deflection (a reverse warp) of the spring plate 6 is suppressed. Namely, the plate pivot 4 can be prevented from being deflected excessively from a predetermined restriction position. In addition, the spherical joint portion 9a of the adjusting nut 9 can be prevented from being dislocated from the concave joint portion 4b in which the spherical joint portion 9a fits.

Next, an operation of the mirror surface angle adjusting unit 12 which is performed while it is electrically operated will be described by reference to FIG. 3.

When the motor 1 is driven in order to adjust the angle of the mirror M, the adjusting nut 9 moves vertically via the worm 1a and the worm wheel 10. When the adjusting nut 9 is moved upwards, the adjusting nut 9 continues to press against the plate pivot 4 so as to tilt it until the normal restriction position is reached where the pivot portion 4a is still allowed to slide.

Furthermore, when the motor 1 is driven to make the adjusting nut 9 press against the plate pivot 4, the spring plate 6 attempts to deflect in the anti-pressing direction, while the plate pivot 4 attempts to be lifted, whereby the plate pivot 4 attempts to be separated from the housing rear 3. However, since the distal end portions of the deflection portions 6b which are attempting to deflect are brought into abutment with the outer circumferential edge portion of the stopper 8, the movement in the anti-pressing direction is restricted, whereby the deflection of the spring plate 6 is suppressed. Namely, the separation of the plate pivot 4 from the housing rear 3 is prevented due to the plate pivot 4 being lifted up, thereby making it possible to reduce the loosening (beating) of the mirror M.

Thus, according to the embodiment, since the stopper 8 is provided for restricting the deformation of the spring plate 6 in the anti-pressing direction, even in the event that a relative force is applied in such a manner that the plate pivot 4 is largely tilted relative to the housing rear 3, the deflection of the spring plate 6 in the anti-pressing direction can be restrained. In particular, the deflecting deformation of the spring plate 6 can be restrained more effectively due to the movement of the distal end portions of the deflection portions 6b, where the deflecting amount becomes maximum, being restricted by the stopper 8.

Consequently, by restraining the deflecting deformation of the spring plate 6, good workability can be ensured when mirrors are replaced, and a stable tilt state of the mirror M which is free from loosening can be ensured.

Second Embodiment

Next, a second embodiment of a member tilting mechanism and a mirror system according to the invention will be described by reference to FIGS. 5 and 6. Note that in the following description (including a third embodiment which will be described later on), like reference numerals are imparted to like constituent elements to those that have been described in the aforesaid embodiment, and the description thereof will be omitted.

Figure 5:
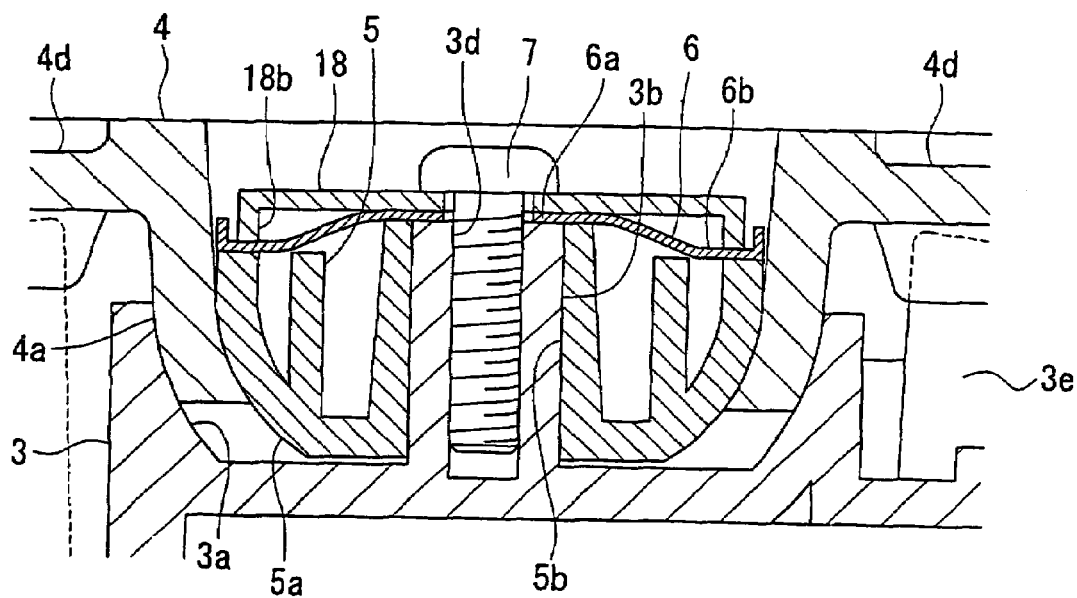
FIG. 5 is a main portion sectional view showing a mirror surface angle adjusting unit in a mirror system of a second embodiment according to the invention.

The second embodiment differs from the first embodiment in that while in the mirror system of the first embodiment, the stopper 8 in the mirror surface angle adjusting unit 12 is simply formed into the shape of the annular flat washer, in a mirror system of the second embodiment, as shown in FIGS. 5 and 6, an outer circumferential edge portion 18b of a stopper 18 is bent towards a spring plate 6 to thereby be brought into abutment with insides of bent portions at distal end portions of deflection portions 6b.

Namely, in the second embodiment, since the stopper 18 has the outer circumferential edge portion 18b that is bent, the rigidity of the stopper itself is increased, and the restriction of the deflection of the spring plate 6 can be implemented in a more endured fashion. In addition, while, in the first embodiment, there may occur a case where a strong force is applied in the tilting direction, whereby the bent portions of the deflection portions 6b are deformed, in the second embodiment, since the outer circumferential edge portion is in abutment with the insides of the bent portions of the deflection portions 6b, the deformation of the bent portions of the deflection portions 6b can be prevented.

Next, a modified example of a stopper according to the invention will be described by reference to FIG. 7.

While the stopper 18 that has just been described above is formed into the shape of the washer whose outer circumferential edge portion 18b is bent, a stopper 28 according to the modified example is, as shown in FIG. 7, formed into a cruciform shape which corresponds to the cruciform spring plate 6.

The stopper 28 of the modified example is made up of a central annular portion 28b having a through hole 28a and restraining portions 28c which extend radially in four directions from the annular portion 28, and the respective restraining portions 28c are bent towards the spring plate 6 at distal ends thereof. In addition, this stopper 28 is placed on the spring plate 6 in such a manner that the respective restraining portions 28b are aligned with the respective deflection portions 6b so that the respective restraining portions 28b abut with or approach the respective deflection portions 6b and is then fixed in place by the tapping screw 7.

The respective restraining portions 28c are set in length in such a manner as to abut with the insides of the bent portions of the deflection portions 6b of the spring plate 6. In addition, the width of the respective restraining portions 28c is set wider than the width of the deflection portions 6b, so that even in the event that the spring plate 6 is caused to deviate slightly in a circumferential direction, the required restriction is attained without being dislocated. Note that a deviation preventive means such as projections which are adapted to be brought into engagement with each other to restrict a circumferential relative rotation of the stopper 28 and the spring plate 6 may be provided at least one of the stopper 28 and the spring plate 6.

With the stopper 28 of the modified example, while the rigidity thereof is lower than that of the washer-shaped stopper 18, the deformation of the bent portions of the deflection portions 6b can be prevented.

Third Embodiment

Next, a third embodiment of a member tilting mechanism and a mirror system according to the invention will be described by reference to FIGS. 8 and 9.

Figure 8:
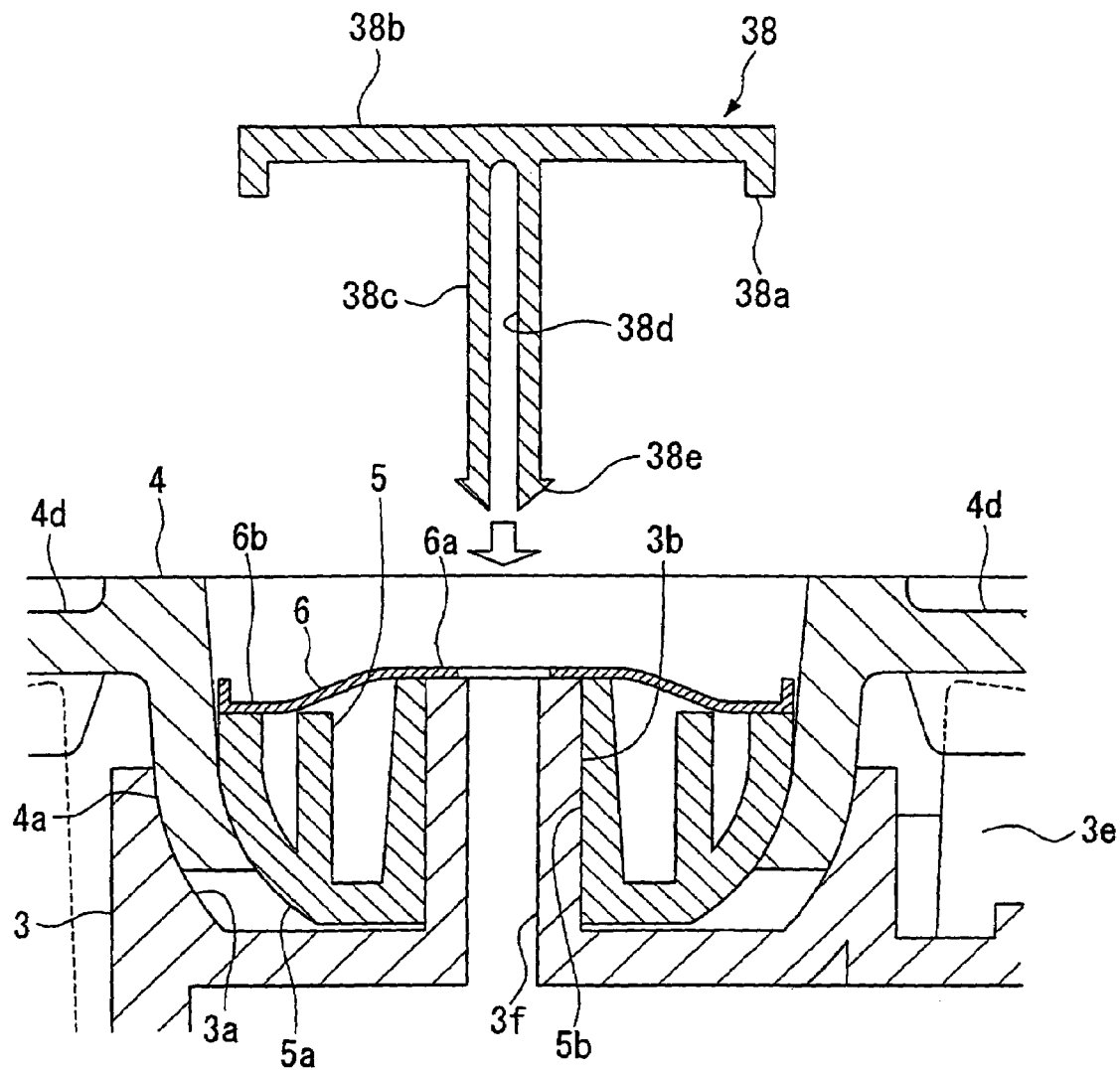
FIG. 8 is a main portion sectional view showing a mirror surface angle adjusting unit while a fixing stopper member is being mounted in a mirror system of a third embodiment according to the invention.
Figure 9:
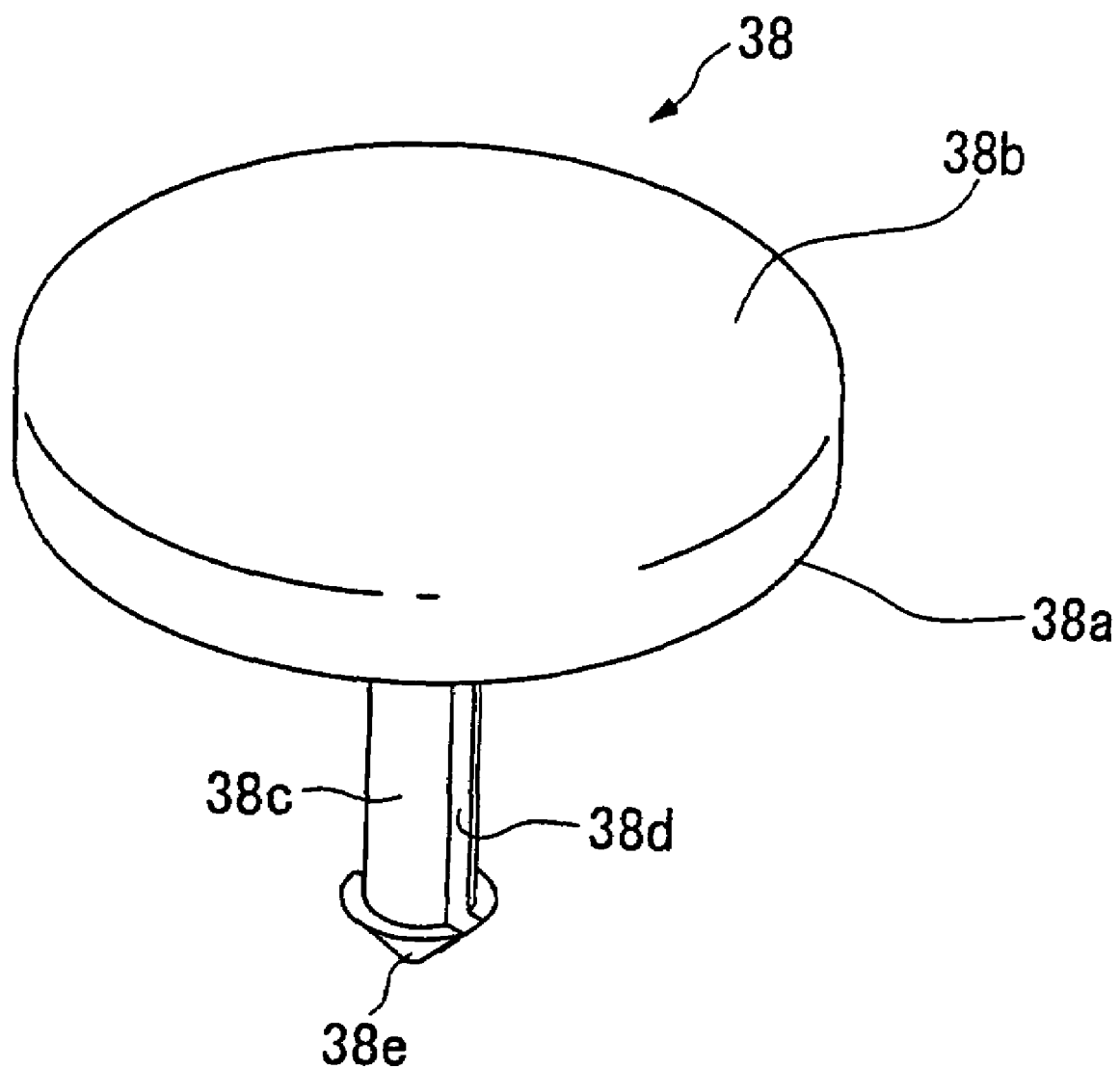
FIG. 9 is a perspective view showing the fixing stopper member in the mirror system of the third embodiment.
Figure 10:
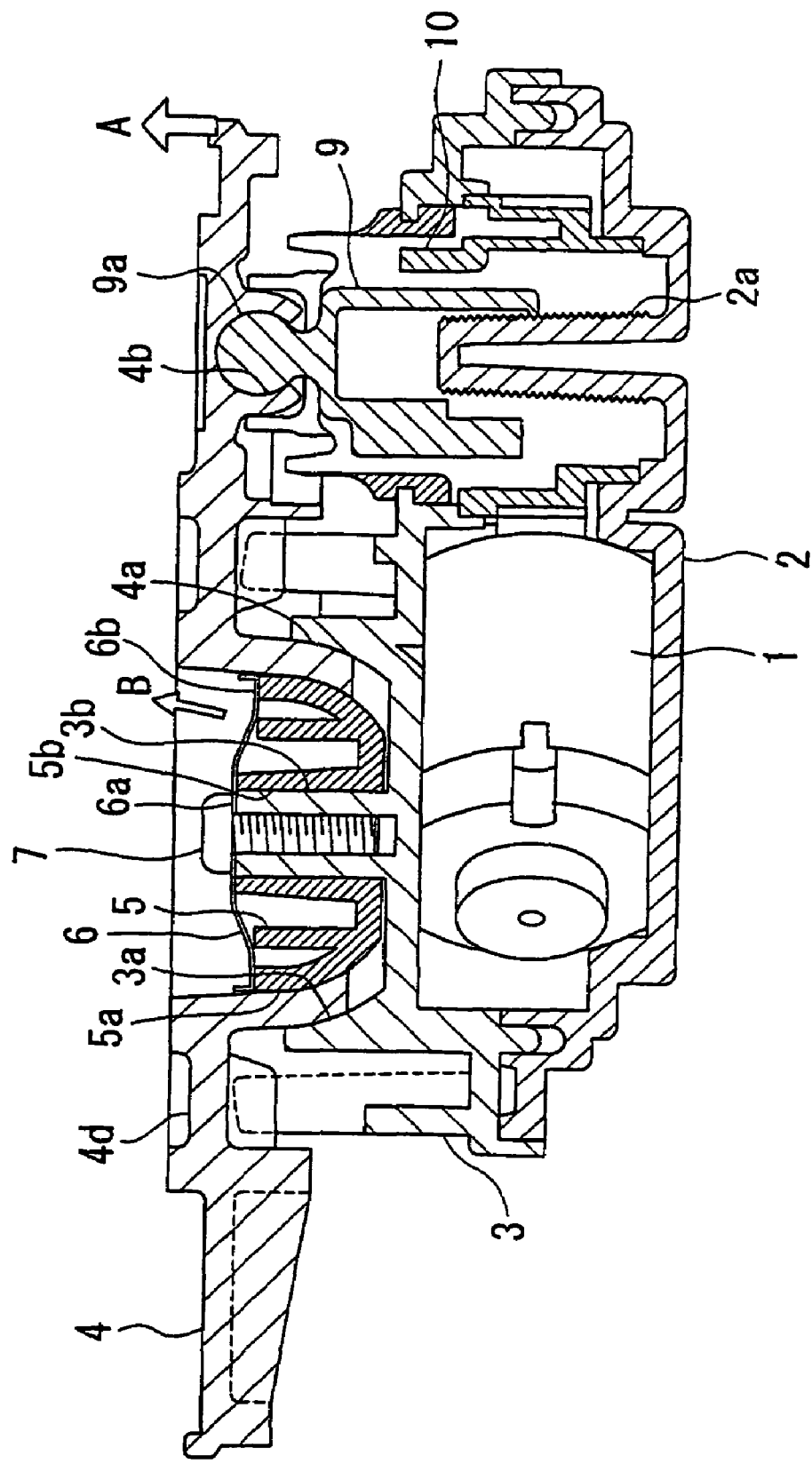
FIG. 10 is a sectional view showing a mirror surface angle adjusting unit in a mirror system of a related example referred to in the specification.

The third embodiment differs from the second embodiment in that while, in the second embodiment, the spring plate 6 and the stopper 18 are fixed to the support tube portion 3b using the tapping screw 7 as the fixing member, in the third embodiment, as shown in FIGS. 8 and 9, the fixing of a spring plate 6 and restraining of deflection portions 6b are implemented at the same time by means of a fixing stopper member (a restricting member) 38 in which a stopper is integrated with a fixing member.

Namely, in the mirror system of the third embodiment, a fixing through hole 3f is formed in a support tube portion 3b of a housing rear 3, and the fixing stopper member 38 is fitted in the fixing through hole 3f so as to fix the spring plate 6 in place. The fixing stopper member 38 is made up of a disc-like stopper portion (a restriction portion) whose circumferential edge portion 38a is bent towards the spring plate 6 and a fixing inserting portion (a fixing portion) 38c provided in such a manner as to protrude perpendicularly from the center of the stopper portion 38b towards the spring plate 6. A slit 38d, which is adapted to cause the fixing inserting portion 38c to be separated at a distal end thereof, is formed in the fixing inserting portion 38c in an axial direction thereof, and an expanded portion 38e is formed at a distal end portion of the fixing inserting portion 38c in such a manner as to expand radially outwardly.

In addition, the outside diameter of the fixing inserting portion 38c is set slightly smaller than the fixing through hole 3f except at the expanded portion 38e, and the outside diameter of the expanded portion 38e is set slightly larger than the inside diameter of the fixing through hole 3f.

Note that there is imposed no limitation on the material of the fixing stopper member 38, and hence the fixing stopper member 38 may be formed of metal or resin, provided that a sufficient rigidity attaining the required fixing and restriction is provided. For example, the fixing stopper member 38 may be formed integrally of a resin.

This fixing stopper member 38 will be mounted as follows.

Firstly, the fixing inserting portion 38c is inserted in the fixing through hole 3f in such a state that the fixing inserting portion 38c is passed through a hole portion 6c in the spring plate 6. As this occurs, since the slit 38d is provided, the outside diameter of the expanded portion 38e is becoming smaller than the inside diameter of the fixing through hole 3f when the insertion is initiated, whereby the fixing inserting portion 38c can pass into the interior of the fixing through hole 3f. Furthermore, when the expanded portion 38e has passed through the fixing through hole 3f, the expanded portion 38e is allowed to restore its initial outside diameter by virtue of an elastic force to thereby be put in a state in which the expanded portion 38e is locked on the housing rear 3, whereby the fixing stopper member 38 is fixed in place. In addition, at the same time that the fixing stopper member 38 is fixed, the outer circumferential edge portion 38a of the stopper portion 38b abuts with or approaches deflection portions 6b of the spring plate 6 to thereby restrict the deformation of the deflection portions 6b.

Thus, in the third embodiment, by utilizing the fixing stopper member 38 in which the stopper portion 38b is integrated with the fixing inserting portion 38c, the stopper portion 38b is also fixed to the housing rear 3 at the same time that the spring plate 6 is fixed to the housing rear 3, whereby both the stopper portion 38b and the spring plate 6 can be fixed to the housing rear 3 with high positional accuracy. Consequently, the number of assembling steps can be reduced, and the number of members can also be reduced, thereby making it possible to realize a reduction in production costs.

In addition, in this embodiment, since the fixing inserting portion 38c taking the form of a fit-in type machine screw is adopted as the fixing means in place of the screw method using the tapping screw, the fixing work can be facilitated.

Note that the technical scope of the invention is not limited to the respective embodiments that have been described heretofore but may be modified variously without departing from the spirit and scope of the invention.

For example, while, in the respective embodiments, the housing rear 3 has the concave spherical portion 3a and the cap support 5 has the convex spherical portion 5a, whereby the plate pivot 4 is held by them in such a manner as to be allowed to tilt, the concave spherical portion and the convex spherical portion may be provided reversely. Namely, the convex spherical portion is provided on the housing rear and the concave spherical portion is provided on the cap support, whereby the pivot plate having the pivot portions corresponding to the convex spherical portion and the concave spherical portion may be held by the housing rear and the cap support in such a manner as to be allowed to tilt.

In addition, while, in the respective embodiments, the housing rear 3 and the housing front 2 are fixed to the body member 14 and the mirror M is attached to the plate pivot 4 side, the relevant members may be fixed and attached reversely; the plate pivot may be fixed to the body member and the mirror may be attached to the side of the housing rear and housing front. Namely, in this case, the housing rear and the housing front are allowed to tilt relative to the plate pivot.

In addition, while the mirror systems of the respective embodiments have been described as being adopted as a vehicle door or side mirror system, the mirror systems of the invention may be applied to other vehicle mirror systems including an inside rearview mirror, a side mirror on the front fender and the like.

Additionally, while the member tilting mechanisms of the respective embodiments have been described as being adopted in the mirror system as the mirror surface angle adjusting unit 12 for enabling the tilt of the mirror M relative to the housing rear 3, the member tilting mechanisms of the invention may be applied to other systems as mechanisms for tilting other members. For example, in a display system such as liquid crystal display, organic EL display, plasma display and the like in which a display plate is supported on a base table, the member tilting mechanisms of the invention may be adopted as a member tilting mechanism for enabling the tilt of the display plate relative to the base table.

What is claimed is:

1. A member tilting mechanism comprising:
a first member including a concave spherical portion;
a second member including a convex spherical portion;
a third member including a pivot portion held between the concave spherical portion and the convex spherical portion;
an elastic member configured to press one of the first member and the second member towards the other thereof so that the third member can tilt relative to the other of the first member and the second member; and
a restricting member configured to restrict a deformation of the elastic member in an anti-pressing direction,
wherein the elastic member comprises:
a non-deflection portion that is fixed in the vicinity of a center of the tilt, and
at least one deflection portion which extends from the non-deflection portion to press the one of the first member and the second member at an end portion thereof,
wherein the restricting member is configured to abut with the end portion of the deflection portion so as to restrict a movement of the end portion in the anti-pressing direction.

2. The member tilting mechanism according to claim 1, wherein the restricting member has a circumferential edge portion bent toward the end portion of the deflection portion so as to abut with the end portion of the deflection portion.

3. The member tilting mechanism according to claim 1, wherein the restricting member has a ring shape, and is configured to restrict the movement of the end portion of the deflection portion by an outer circumferential edge portion thereof.

4. The member tilting mechanism according to claim 1, wherein the restricting member has a disc shape, and is configured to restrict the movement of the end portion of the deflection portion by an outer circumferential edge portion thereof.

5. The member tilting mechanism according to claim 1, wherein a central portion of the restricting member is disposed on the non-deflection portion.

6. The member tilting mechanism according to claim 1, wherein the restricting member has a shape which corresponds to a shape of the elastic member.

7. The member tilting mechanism according to claim 1, wherein the restricting member comprises at least one restraining portion configured to restrict the movement of the end portion of the deflection portion, and
wherein a width of the restraining portion is wider than the width of the end portion of the deflection portion.

8. A member tilting mechanism comprising:
a first member including a concave spherical portion;
a second member including a convex spherical portion;
a third member including a pivot portion held between the concave spherical portion and the convex spherical portion;
an elastic member configured to press one of the first member and the second member towards the other thereof so that the third member can tilt relative to the other of the first member and the second member; and
a restricting member configured to restrict a deformation of the elastic member in an anti-pressing direction,
wherein the restricting member comprises:
a restricting portion configured to restrict the deformation of the elastic member; and
a fixing portion configured to fix the elastic member at a predetermined position together with the restricting portion,
wherein the restricting portion and the fixing portion are integrated with each other.

9. The member tilting mechanism according to claim 8, wherein the fixing portion is configured to fix the elastic member and the restricting portion to the other of the first member and the second member.

10. A mirror system comprising:
   a mirror member;
   a mirror support member configured to support the mirror member;
   a member tilting mechanism configured to tile the mirror member, comprising:
      a first member including a concave spherical portion;
      a second member including a convex spherical portion;
      a third member including a pivot portion held between the concave spherical portion and the convex spherical portion;
      an elastic member configured to press one of the first member and the second member towards the other thereof so that the third member can tilt relative to the other of the first member and the second member; and
      a restricting member configured to restrict a deformation of the elastic member in an anti-pressing direction, and
   a body member configured to support the member tilting mechanism,
   wherein the mirror member is fixed to the third member, and the body member is fixed to the other of the first member and the second member.

11. The mirror system according to claim 10, wherein the restricting member has a circumferential edge portion bent toward the end portion of the deflection portion so as to abut with the end portion of the deflection portion.

12. The mirror system according to claim 9, wherein the restricting member has a ring shape, and is configured to restrict the movement of the end portion of the deflection portion by an outer circumferential edge portion thereof.

13. The mirror system according to claim 10, wherein the restricting member has a disc shape, and is configured to restrict the movement of the end portion of the deflection portion by an outer circumferential edge portion thereof.

14. The The mirror system according to claim 10, wherein a central portion of the restricting member is disposed on the non-deflection portion.

15. The mirror system according to claim 10, wherein the restricting member has a shape which corresponds to a shape of the elastic member.

16. The mirror system according to claim 10, wherein the restricting member comprises at least one restraining portion configured to restrict the movement of the end portion of the deflection portion, and
   wherein a width of the restraining portion is wider than the width of the end portion of the deflection portion.

17. The mirror system according to claim 10, wherein the restricting member comprises:
   a restricting portion configured to restrict the deformation of the elastic member; and
   a fixing portion configured to fix the elastic member at a predetermined position together with the restricting portion,
   wherein the restricting portion and the fixing portion are integrated with each other.

18. The mirror system according to claim 17, wherein the fixing portion is configured to fix the elastic member and the restricting portion to the other of the first member and the second member.

* * * * *